FIG. I

INVENTORS.
BEN DAVIES
ELDON D. MILLER, JR.

BY William C. Nealon

ATTORNEY

Jan. 18, 1966  B. DAVIES ETAL  3,230,100
REFRACTORY

Filed Feb. 15, 1965  4 Sheets-Sheet 2

Inventors.
BEN DAVIES
ELDON D. MILLER, JR.
By William C. Kealen
Attorney

Jan. 18, 1966  B. DAVIES ET AL  3,230,100
REFRACTORY
Filed Feb. 15, 1965  4 Sheets-Sheet 4

FIG. 8

INVENTORS
BEN DAVIES
ELDON D. MILLER, JR.
BY William C. Meahn
ATTORNEY

United States Patent Office 3,230,100
Patented Jan. 18, 1966

3,230,100
REFRACTORY
Ben Davies, Pittsburgh, and Eldon D. Miller, Jr., Bridgeville, Pa., assignors to Harbison-Walker Refractories Company, Pittsburgh, Pa., a corporation of Pennsylvania
Filed Feb. 15, 1965, Ser. No. 436,412
27 Claims. (Cl. 106—44)

This application in part contains and claims the subject matter of copending application Serial No. 205,535 filed June 27, 1962, entitled "Alumina Refractories," (now abandoned) which application is in turn an application claiming subject matter in part disclosed but not claimed in then copending application Serial No. 847,865 filed October 22, 1959, and which is now United States Patent No. 3,067,050, entitled "Alumina Refractories." The present application further in part contains the subject matter disclosed and claimed in copending United States application Serial No. 280,387 filed May 14, 1963, entitled "Refractory," (now abandoned) which is in turn a continuation-in-part of then copending application Serial No. 212,063 filed July 24, 1962, which was abandoned in favor of said application Serial No. 280,387. The benefits of 35 U.S.C. 120 are hereby claimed.

This invention relates to refractories, and more particularly to improved refractories of relatively high silicon carbide content.

Prior refractories containing silicon carbide generally have been either +85% silicon carbide refractories having special utility in certain high temperature installations such as for kiln furniture, in nonferrous foundry applications and, in some places, for abrasion resistance, or they have been so called "semi silicon carbide" refractories, which are of low silicon carbide content and are used where lower thermal conductivity is required, or in some installations where abrasion resistance is desired, such as in the nose rings of rotary kilns. However, the first type lacks oxidation resistance, and refractories of the latter type generally have poor strength and density. The high silicon carbide content refractories tend to grow as they oxidize in service, while the low silicon carbide content types usually have a fireclay base and therefore poor load bearing capacity at high temperatures. For the types containing over 85% silicon carbide, fluxing agents are normally required to retard oxidation or else expensive nitriding or like processes must be used to improve the stability of the silicon carbide.

Accordingly, it is an object of this invention to provide improved silicon carbide-containing refractories having good oxidation resistance, load bearing capacity, and hot strength.

It is another object of this invention to provide improved silicon carbide-containing refractories of good slag resistance, having utility in steel casting, iron blast furnace, and copper furnace metallurgical installations.

It is another object of this invention to provide silicon carbide-containing refractories having wide refractory application. It is still another object of this invention to provide refractory items containing silicon carbide, which have good strength and density, which exhibit substantially uniform thermal conductivity over a wide temperature range, which have good thermal shock resistance and good dimensional stability, relatively low porosity, and which are substantially free of adulterating fluxes, glasses and the like.

It is still another object of this invention to provide a method of economically fabricating improved silicon carbide-containing refractories.

Briefly, silicon carbide-containing refractory material, according to the concepts of this invention, is comprised of, in one embodiment, 50 to 70% coarse ground silicon carbide, the remainder being substantially clay-free, mullite-matrix forming material. In a preferred embodiment, the refractory is comprised of a mixture of about 50 to 70% −8+30 mesh silicon carbide, the remainder being comprised of finely divided high purity alumina, high purity silica, such as potters flint, and very finely divided silica such as volatilized silica. The sizing of −8+30 mesh refers to the nominal grain sizing, it being known that industrial screening falls short of perfection, and that some particles coarser than the coarser specified screen and some finer than the finer screen are to be expected. This minor scattering from the nominal size fraction results further as a few of the coarser sized grains are broken down in handling the refractory batch, particularly in forming it into shapes. Also the 8 and 30 mesh screen sizing obviously refers to the U.S. standard screen series. Equivalent Tyler series screens would be about 8 and 28 mesh screens.

Microscopically, the refractories of this invention are characterized by a major single component of silicon carbide, the separate particles of which are very irregular, angular forms, with the edges of the separate particles showing gradations from a generally straight to generally curved or rounded configuration. The groundmass or matrix is characterized by a complex association of mullite with minor amounts of heat-altered silica, such as cristobalite and very fine alumina, the alumina particles being characterized as very rough, peripherally corroded grains dispersed through the mullite groundmass.

A better understanding, further features, other objects and advantages of this invention will become apparent to those skilled in the art from a study of the following detailed description with reference to the drawings. In these drawings.

One test mix of this invention was comprised of about 63% of −8+30 mesh (U.S. series) silicon carbide, 12% fine tabular (dense, high fired) alumina, about 15% of −325 (Tyler) mesh moderately calcined alumina, about 5% of potters flint, and about 5% of volatilized silica. Brick were fabricated from the foregoing mix in two different manufactures, pressed at 8000 p.s.i., and burned at cone 18 (about 2700° F.) with a heating schedule of about 100° F. per hour to the top temperature which was held for 10 hours. Mineralogical examination showed that this heat treatment largely brought the silica into reaction with alumina to form the mineral mullite ($3Al_2O_3 \cdot 2SiO_2$).

The resulting brick exhibited a "salt and pepper" color because of the mixture of large black silicon carbide particles, and very white mullite matrix formed from the alumina and volatilized silica. The completed tests, as substantiated by the laboratory work set forth hereafter, showed these test brick to have a number of very remarkable and unexpected properties. One of the more important results was observed in a steam oxidation test at 1800° F.; i.e. after 500 hours the brick had expanded only 0.8% at a mere weight gain of 0.5% as compared to 6 to 10% expansion, and 4 to 12% weight gain for the major type of previously available silicon carbide refractories (+85% SiC) subjected to similar test conditions.

In other tests, refractories according to this invention showed very low porosity and excellent strength at all temperatures at which they were tested. Their modulus of rupture was good at 2500° F., and they exhibited little subsidence under load at the elevated temperature of 3200° F. Previously available +85% silicon carbide tile were subjected to a comparative load test and failed at 2950° F.

In all the tests, excellent thermal shock resistance was exhibited by our brick. Also, no loss or apparent cracking was exhibited in spalling tests.

To still further study the properties of our refractories, brick test specimens were subjected to a series of reheats at 2730° F., 2910° F., and 3000° F., the temperatures held 5 hours. In these reheats, the test specimens showed very little linear or volume change. Surface blistering was negligible and, in any event, far less than +85% silicon carbide under similar test conditions. The test brick of this invention were also subjected to a slag test at 2780° F. using a complex $CaO-Al_2O_3-SiO_2$ slag, and had volume erosion of only 1.8 cubic centimeters, which our experience shows to be very good slag resistance.

In still other tests, brick according to the instant invention were subjected to tests to discover the relative resistance thereof to penetration by metallic copper. These tests were quite surprising in that subjecting the brick to molten copper at a temperature 2300° F. resulted in only negligible attack by the copper, and no penetration.

Table I is indicative of a preferred mix for fabrication of refractories, according to the instant invention, and Table II sets forth the results of testing this mix:

TABLE I [1]

*(All parts by weight)*

Mix: Percent

Silicon carbide (U.S. series screens)—
- −8+16 mesh _______________________ 26
- −16+30 mesh ______________________ 37

Alumina (Tyler screens)—
- Tabular, −60 mesh _________________ 12
- Moderately calcined, −325 mesh _____ 15

Silica—
- Crystalline silica (potters flint, −200 mesh, Tyler) _______________________ 5
- Volatilized silica __________________ 5

[1] See note (2) of Table III for chemical analysis of mix constituents.

TABLE II

| | First manufacture | Second manufacture |
|---|---|---|
| Burn, cone | 18 | 18 |
| Linear change in burning, percent | +0.3 | +0.2 |
| Bulk density, p.c.f. | 165 | 168 |
| Modulus of rupture: | | |
| At 70° F | 1,830 | 2,170 |
| At 1,500° F | 2,510 | 2,810 |
| At 2,500° F | 2,150 | 2,430 |
| At 2,700° F | 1,180 | 1,240 |
| Apparent porosity, percent | 11.7 | 12.5 |
| Reheat 2,730° F. (av. 2), percent: | | |
| Linear change | Not tested | +0.1 |
| Volume change | do | +0.7 |
| Reheat 2,910° F., percent: | | |
| Linear change | do | +0.3 |
| Volume change | do | +2.2 |
| Reheat 3,000° F., percent: | | |
| Linear change | | +0.8 |
| Volume change | | +1.6 |
| Load test (no hold time) subsidence at 3,200° F., percent: | | |
| 25 p.s.i. | Not measured | 1.5 |
| 50 p.s.i. | do | 1.7 |
| Steam oxidation test at 1,800° F.[1] linear expansion, percent: | | |
| After 300 hours | do | 0.5 |
| After 500 hours | do | 0.8 |
| Weight gain, percent: | | |
| After 300 hours | do | 0.4 |
| After 500 hours | do | 0.5 |
| Thermal coefficient of expansion (70–2,400° F.), inches/inch/° F | do | $2.7 \times 10^{-6}$ |
| Modulus of elasticity, p.s.i. | do | $9.0 \times 10^{6}$ |
| Thermal conductivity B.t.u./hr./sq. ft./° F./in.: | | |
| At 250° F | do | 51 |
| At 1,000° F | do | 48 |
| At 2,000° F | do | 47 |

[1] Second manufacture specimens showed good strength after 500 hours.

The procedure for fabrication of the brick for the tests was as follows: the batches made from the mix, as detailed above, were dry-mixed for five minutes, then an additional five minutes, adding about 2% concentrated waste lignin liquor and about 2.5% water, by weight, as tempering fluids. The brick were pressed at 8000 p.s.i. and burned to cone 18, four high on edge. No sticking or deformation occurred during the burning.

The foregoing tests showed surprising improvement in properties of silicon carbide refractories, according to this invention, and resulted in further test work to determine the range of composition, which would also provide the desired properties.

Figure 1:
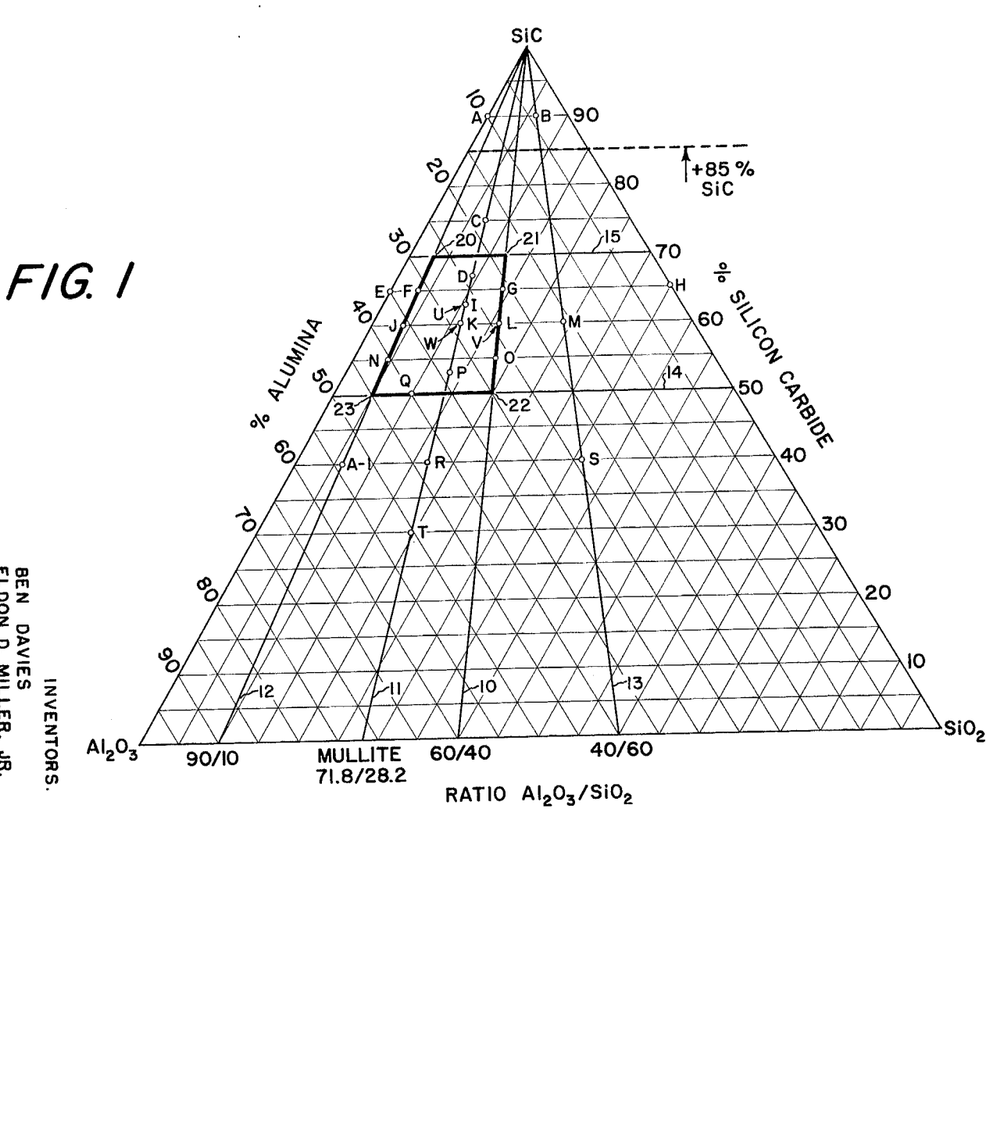
FIG. 1 is a ternary diagram illustrating preferred compositions of refractories, according to this invention.

FIG. 1 will serve to more fully explain the additional test work and its relationship to other prior art-type refractories. This diagram utilizes the principles which characterize all such three-component charts. This one encompasses all possible combinations of the three components: silicon carbide (SiC), silica ($SiO_2$), and alumina ($Al_2O_3$). The apex at SiC represents 100% of this component, the lower left corner 100% $Al_2O_3$, and the right corner 100% $SiO_2$. Near the top of the diagram is the 50 to 70% SiC band of compositions, which contains most of the mixes characterizing my invention. The +85% area, which encloses 90 to 95% of today's commercial silicon carbide refractories, adjoins the apex.

Our invention concerns compositions which, on being analyzed chemically, would be found to consist substantially of SiC, $SiO_2$, and $Al_2O_3$. Our batch constituents are comprised of these same materials. Thus, to secure SiC, we actually use silicon carbide as the batch component, to provide a final analysis showing $SiO_2$ and $Al_2O_3$, in some mixes, we use as batch components silica (silicon dioxide) and aluminum oxide, in substantially pure forms. These compositions are all representable on the chart of FIG. 1. It is also possible to include on this chart quite different batches; for example, Mixes W and U of Table III, which contain prereacted mullite ($3Al_2O_3 \cdot 2SiO_2$) or ball clay (61.5% $SiO_2$, 34.3% $Al_2O_3$), and Mixes S and M which include flint clay.

In any ternary diagram, the three sides represent the three binary systems, which in this instance are $Al_2O_3-SiC$ (at the left), $SiC-SiO_2$ (at the right), and $Al_2O_3-SiO_2$ (at the bottom). All compositions represented on the bottom line consist only of $Al_2O_3$ and $SiO_2$, and all possible combinations of these two components are represented on this line. Thus, the point exactly in the middle of this line represents 50% $Al_2O_3$ and 50% $SiO_2$. The formula of the mineral mullite ($3Al_2O_3 \cdot 2SiO_2$) is equivalent to 71.8% $Al_2O_3$, 28.2% $SiO_2$. This composition is "Mullite" on the base of the triangle.

It is a characteristic of the geometry of such diagrams, that a line drawn from any point on the base (such as the "Mullite" line base intersection) to the opposite corner, will mark the loci of every composition in the entire ternary system having the same ratio of the two base components. Thus, every point on line 11, drawn from the mullite composition, will represent mixes having $Al_2O_3$ and $SiO_2$ in the mullite ratio of 71.8/28.2. As we move from the base towards the apex, the only thing to change will be the amount of SiC which is zero at the base line, but which rises to 100% at the apex.

Lines 10, 12 and 13 represent similar relationships but with differing $Al_2O_3/SiO_2$ ratios. Thus, line 12 represents mixes of the same three components but with an $Al_2O_3/SiO_2$ ratio of 90/10, an excess of $Al_2O_3$ over that needed to convert wholly to mullite. Line 10 represents the 60/40 $Al_2O_3/SiO_2$ ratio and line 13, the 40/60 ratio, both providing an insufficiency of $Al_2O_3$ for complete conversion to mullite. The 40/60 $Al_2O_3/SiO_2$ line 13 has special meaning for silicon carbide refractories, because this is approximately the ratio of these two oxides in clays used for bonding. Clay has commonly been used in small amounts as a bond for SiC (the +85% kinds), and SiC in amounts under 50% have been added to clays to form the semi-silicon carbide refractories previously referred to. All such compositions of either type may generally be represented along line 13 in FIG. 1.

The mixes described in the following table, Table III, are but representative of the extensive testing we undertook to establish the mineralogical and physical character of refractory according to this invention:

When we refer to our composition as showing, on an oxide basis, the three constituents silicon carbide, $Al_2O_3$ and $SiO_2$, these constituents are determined in the above manner. Obviously, when testing unknown batches, it is first essential to establish, by microscopic or X-ray means, that these are, in fact, the three constituents present.

TABLE III [1]

[All parts by weight]

| Mix No. | A[2] | B | C | D | E | F | G | H | I | J | K | L | M | N | O | P | Q | R | S | T | U | V | W |
|---|---|---|---|---|---|---|---|---|---|---|---|---|---|---|---|---|---|---|---|---|---|---|---|
| Silicon Carbide (sizing, U.S. series), percent: | | | | | | | | | | | | | | | | | | | | | | | |
| 8/16 mesh | 36 | 36 | 25 | 25 | 25 | 25 | 25 | 25 | 23 | 20 | 20 | 20 | 20 | 20 | 20 | 20 | 20 | 20 | 20 | 20 | 20 | 20 | 20 |
| 16/30 mesh | 18 | 18 | 40 | 40 | 40 | 40 | 40 | 40 | 40 | 40 | 40 | 40 | 40 | 35 | 35 | 33 | 30 | 20 | 20 | 10 | 40 | 40 | 40 |
| Settling tank fines (about −150 mesh) | 36 | 36 | 10 | 2 | | | | | | | | | | | | | | | | | | | |
| Alumina (sizing, Tyler series), percent: | | | | | | | | | | | | | | | | | | | | | | | |
| 10/65 mesh | | | | | | | | | | | | | | 5 | 5 | 12 | 10 | 20 | | 30 | | | |
| −65 mesh | | | 3 | 8.5 | 20 | 16.5 | 6 | | 11.5 | 21 | 13.5 | 9 | | 20.5 | 7 | 6.5 | 15 | 8 | | 5 | 4 | 9 | |
| −325 mesh | 10 | | 15 | 15 | 15 | 15 | 15 | | 15 | 15 | 15 | 15 | | 15 | 15 | 15 | 15 | 15 | | 15 | 15 | 15 | |
| Silica (sizing, Tyler series), percent: | | | | | | | | | | | | | | | | | | | | | | | |
| Crystalline silica, −200 mesh | | | 2 | 4.5 | | | 9 | 30 | 5.5 | | 6.5 | 11 | | | 13 | 8.5 | 5 | 12 | | 15 | | 16 | |
| Very finely divided silica (as volatilized silica), −325 mesh | | | 5 | 5 | | 3.5 | 5 | 5 | 5 | 4 | 5 | 5 | | 4.5 | 5 | 5 | 5 | 5 | | 5 | | | |
| Clay materials ($Al_2O_3$-$SiO_2$) (sizing, Tyler series), percent: | | | | | | | | | | | | | | | | | | | | | | | |
| Calcined flint clay, 10/65 mesh | | | | | | | | | | | | | | | | | | | 20 | | | | |
| Calcined flint clay, ball mill fines, −65 mesh | | | | | | | | | | | | | 25 | | | | | | 25 | | | | |
| Kentucky ball clay, −325 mesh | | 10 | | | | | | | | | | | 15 | | | | | | 25 | | 21 | | |
| Prereacted Mullite (all −65 mesh, 70% −325, Tyler), percent | | | | | | | | | | | | | | | | | | | | | | | 40 |
| Batch sizing (Tyler series), percent −65 mesh or finer of total mix | 46 | 46 | 35 | 35 | 35 | 35 | 35 | 35 | 37 | 40 | 40 | 40 | 40 | 40 | 40 | 40 | 40 | 40 | 40 | 40 | 40 | 40 | 40 |

[1] For the mix components of this table, the chemical analysis, on an oxide basis is as follows:

| | Kentucky ball clay | Prereacted Mullite | Calcined flint clay | Silicon carbide | Alumina | −200 mesh silica | −325 mesh silica |
|---|---|---|---|---|---|---|---|
| Silica ($SiO_2$), percent | 61.5 | 28.2 | 48.4 | | | 99.9 | 96 |
| Alumina ($Al_2O_3$), percent | 34.3 | 71.8 | 46.8 | | 99 | | |
| Carbon and silicon as SiC, percent | | | | 97 | | | |
| Trace impurities, percent | 4.2 | | 4.8 | 3 | 1 | 0.1 | 4 |

[2] For a Mix A substitute (U.S. Series Screens): 16/30 for 8/16; 30/50 for 16/30; 100 and finer for ST fines.

For the Table III analysis, our methods for conducting oxide analyses are essentially those of ASTM for refractory materials, and involve the following steps:

(1) Determine total carbon and free carbon; deduct free carbon from total carbon, and assume that the difference represents carbon present as SiC.

(2) Determine total $Al_2O_3$ and $SiO_2$ by wet analytical methods. The $Al_2O_3$ figure represents the total $Al_2O_3$ in the sample. The $SiO_2$ will represent all of the $SiO_2$ whether present as silica, silicates or SiC, and must therefore be adjusted as follows:

(3) Taking the total $SiO_2$ figure from (2), deduct the amount calculated in (1) to be present as SiC; the remainder is judged to be present as $SiO_2$ (silica or silicates) but not as silicon carbide.

TABLE IV

| Mix | Weight, p.c.f. | Modulus of rupture | Porosity | Permeability | Modulus of rupture at 2,500° F. | 2730° F. sag test inches deflection |
|---|---|---|---|---|---|---|
| A | 153 | 2,200 | 20.4 | 0.87 | 2,740 | 0.00 |
| B | 155 | 1,770 | 12.7 | 0.04 | 2,010 | 0.00 |
| C | 156 | 2,470 | 17.4 | 0.08 | 1,920 | 0.04 |
| D | 161 | 2,210 | 15.9 | 0.63 | 2,240 | 0.04 |
| E | 161 | 740 | 20.2 | 0.75 | 890 | 0.04 |
| F | 164 | 1,510 | 16.8 | 1.02 | 1,550 | 0.04 |
| G | 158 | 1,430 | 16.7 | 0.50 | 1,910 | [1] 0.03 |
| H | 134 | 80 | 24.2 | 1.11 | 320 | 0.00 |
| I | 162 | 1,850 | 15.9 | 0.93 | 2,250 | 0.00 |
| J | 167 | 1,570 | 16.4 | 0.48 | 1,510 | 0.00 |
| K | 164 | 1,690 | 16.2 | 0.52 | 2,110 | 0.00 |
| L | 159 | 1,130 | 17.1 | 0.43 | 1,760 | 0.05 |
| M | 153 | 1,280 | 16.1 | 1.06 | 1,240 | 0.09 |
| N | 169 | 1,480 | 17.9 | 1.10 | 1,390 | 0.04 |
| O | 158 | 890 | 18.6 | 0.25 | 1,490 | 0.05 |
| P | 162 | 1,010 | 18.9 | 0.37 | 1,430 | 0.04 |
| Q | 166 | 1,630 | 16.6 | 0.23 | 1,920 | 0.03 |
| R | 162 | 750 | 19.2 | 0.33 | 980 | 0.05 |
| S | 148 | 1,240 | 16.6 | 0.93 | 700 | 0.33 |
| T | 160 | 670 | 20.6 | 0.10 | 940 | 0.06 |
| U | 157 | 1,070 | 18.9 | 0.05 | 1,030 | 0.11 |
| V | 146 | 260 | 25.4 | 0.27 | 360 | 0.07 |
| W | 152 | 820 | 21.1 | 0.30 | 310 | [2] 0.10 |

[1] Cracked.  [2] Broken.

Table III and FIG. 1 serve to represent the additional refractory compositions we have studied. All of the compositions of Table II, which we have made and tested, are likewise represented in FIG. 1. The results of testing refractories made of these compositions are shown in Table IV. These mixes, which were prepared and fabricated into shapes in the same manner as set forth above in describing the initial testing work, were subjected to rigorous comparative testing.

For purposes of better comparison, the mix of the initial testing procedure was repeated, and is Mix I of Table III. In Table IV, "Modulus of Rupture" is modulus of rupture in lbs. per sq. in. at ambient temperature conditions. "Porosity" is apparent porosity, as measured by the ASTM method, "Permeability" is permeability in air flow through the test piece in cubic inches per second per square inch per inch thickness per pound pressure.

Mix B in Table III is chosen as fairly typical of present-day silicon carbide refractories in the +85% SiC field. It is comprised of SiC bonded with 10% clay. Mix A is a related prior composition, with alumina substituted for the clay. The latter mix is of particular interest, because it has been said that some mullite may form from reaction of the alumina with $SiO_2$ formed as films on the SiC grains when they are allowed to oxidize. Mix C probably has no counterpart in conventional refractories, but was included in our studies so that we might know the properties of a silicon carbide refractory containing 75% SiC. Mix S is typical of refractories sold as semi-silicon carbide brick, being comprised of 40% SiC in a clay base. Mix T, being on the mullite line 11 on FIG. 1, has $SiO_2$ and $Al_2O_3$ components in the mullite ratio, but with only 30% SiC. Mix R is a similar mix with 40% SiC.

Mixes A and B formed with difficulty in pressing, a property recognized as typical of prior refractory batches in this range of composition. Careful handling eventually produced bodies corresponding to Mixes A and B, which could be used for the purposes of the tests reported.

Mixes A, B and C all severely oxidized at 2730° F. and higher, forming a glassy melt over their exterior surfaces. Also, as was expected, the test specimens corresponding to Mixes A, B and C gained weight and grew considerably in volume upon heating. Mixes M and H, which are on the clay side or high silica side of the ternary diagram—FIG. 1, gave poor results in the 2730° F. sag test. In fact, Mix H cracked and broke. Also, Mix H had an undesirably high porosity, low cold strength and low hot strength at 2500° F. Both Mixes M and H had an excessive glassy coating formed over their surfaces at 2730° F. in the sag test.

Mix E, containing no silica, had very poor cold strength and, although this increased somewhat at 2500° F., was considerably less than would be desired for most service installations.

Mixes R, S and T exhibited poor strength at 2500° F. Mix S had the highest deflection of these three mixes in the sag test at 2730° F.

Mixes F, J and N, along the 90/10 $Al_2O_3/SiO_2$ line 12, had hot modulus of ruptures ranging from 1390 to 1550, which—while less than some of our better mixes, such as D or I—were considerably better than that of Mix E, which falls to the left of the 90/10 line (higher alumina/silica ratio) and, in fact, contains no added silica. Note that Mix F, which is closest in composition to Mix E, had an improvement of over 600 p.s.i. in modulus of rupture.

Mixes G, L and O, along the 60/40 $Al_2O_3/SiO_2$ line 10, had modulus of ruptures ranging from 1490 to 1910. Mix M, to the right of these mixes and on the clay line 13, had lower modulus of rupture of 1240. Also, as the mixes pass to the right of the 60/40 line 10, glass formation becomes more pronounced on heating, becoming intolerable as the clay line 13 is approached and passed. Mix H, which is beyond the clay line 13 of the diagram, was a complete failure in our tests.

Thus, the 90/10 line 12 and the 60/40 line 10 substantially delimit the $Al_2O_3/SiO_2$ content of the better or optimum refractories, according to one aspect of this invention.

The 70% SiC line 15 is substantially the upper limit for SiC. Above line 15, insufficient $Al_2O_3$ and $SiO_2$ are present to form the desired strong mullite bond for my refractories. Also, compositions above line 15 (with SiC fines necessary to make shapes) lack oxidation resistance, tend to gain in volume and weight on heating, tend to glassify in extended service, are more difficult to form into shapes for burning, and lose strength and shock resistance in extended service.

The 50% SiC line 14 is generally the lower limit of our compositions with regard to SiC. Note Mixes R, S and T, which are below line 14, and which had undesirably low hot modulus of ruptures. Thus, lines 14 and 15, the 50 and 70% lines, generally delimit the SiC content of better or optimum refractories according to one aspect of our invention.

From the foregoing tests, it was concluded that the most satisfactory of all compositions for better or optimum refractories, according to one aspect of this invention, fall within the area generally defined by the straight lines intersecting at points 20–21–22 and 23 in the alumina, silica, silicon carbide, ternary diagram of FIG. 1. Included within this area are Mixes D, F, G, I, J, K, L, N, O, P and Q, reported in the tests above.

This area comprises mixes with SiC content of about 50 to 70%, and with alumina and silica present in ratios ranging from 90/10 to 60/40. It will be noted that these ratios bear a certain relationship to the mullite ratio, their compositions falling close to it and on either side, and with best results when the $SiO_2/Al_2O_3$ ratio is substantially on the mullite line.

Having established the preferred compositional area, additional tests were undertaken to determine the importance of grain sizing and the physical form of the SiC, $SiO_2$ and $Al_2O_3$ which were used. Mixes U, V and W are indicative of some of the mixes which were so tested. Mix U is similar to Mix I, discussed above, except that a portion of the $Al_2O_3$ and all of the $SiO_2$ content thereof was included as ball clay. It is important to note that considerably less strength was obtained, as compared to Mix I, as well as a considerable increase in deflection in the 2730° F. sag test. The $Al_2O_3$ and $SiO_2$ are combined, and generally present as $Al_2O_3 \cdot 2SiO_2 \cdot 2H_2O$. Mix V (substantially the same composition as Mix L) used only −200 mesh, crystalline silica or potters flint as the $SiO_2$ content, and gave very low strength and undesirable porosity. These tests illustrated the importance of finely divided (−325 mesh, Tyler) silica as at least a portion of the $SiO_2$ of the mix. Also, the −325 mesh, Tyler, portion must be uncombined, i.e. not in a form such as in ball clay. In the tests above, we used volatilized silica as a source of the −325 mesh, Tyler, silica portion of the mixes. The minimum operable amount of the volatilized silica is about 1% by weight of the total batch. Actually, volatilized silica is much finer than this figure would indicate.

As noted above, the groundmass of refractories, according to this invention, is primarily mullite. Therefore, Mix W (substantially the same composition as Mix K) was compounded, in which a prereacted mullite of proper grain sizing was mixed with coarse silicon carbide. A very surprising decrease in cold strength, an exceptionally low modulus of rupture at 2500° F., and failure in the sag test were noted.

These alternate test mixes, U, V and W, proved that the major portion of the groundmass or matrix must be mullite formed in situ, and that the $SiO_2$ content of the total mix must include an addition of finely divided (−325 mesh, Tyler) silica.

In other tests, Mix Q was found particularly suitable for slip casting techniques. Shapes formed, according to such techniques gave physical properties very similar to those reported in Table IV.

Our work also established that by far the major portion of the SiC content must be substantially all in the form of very coarse particles. When the silicon carbide addition is too fine (less than about 30 mesh, U.S. screen series) it promotes oxidation too rapid for some service environments and seems to promote wetting by some slags. While the refractory compositions of this invention tend to be oxidized to some extent, by the incorporation of the silicon carbide only in the form of coarse particles, there is mass action effect, i.e. a large volume and weight of silicon carbide is incorporated in the refractory body with a considerable reduction in exposed surface area. Because of this reduced surface area, while refractory shapes according to this invention may oxidize, such oxidation occurs at a very slow rate. Also, in order to provide sufficient finely divided material in the mix as to promote formation of mullite in situ and still having a workable refractory batch, the alumina and silica content must constitute most of the fines. Furthermore, the massive effect of coarse sizing for the particles of silicon carbide has been discovered to considerably increase the resistance to thermal shock. It will, of course, be possible to use small amounts of fine SiC, not exceeding about 5% and still have good oxidation resistance and service growth of less than about 1%. As it is discussed below, however, more fines can be tolerated in some environments. Small quantities of fine SiC (less than 5%), of course, are always present, due to screen tolerance and to forming by attrition in handling the batches.

In FIGS. 2–7, the structural character of silicon carbide refractory compositions, according to this invention and as recorded in Tables III and IV, is shown to be substantially uniform in the area bounded by the lines intersecting at 20–21–22–23 of the ternary diagram of FIG. 1.

Figure 2:
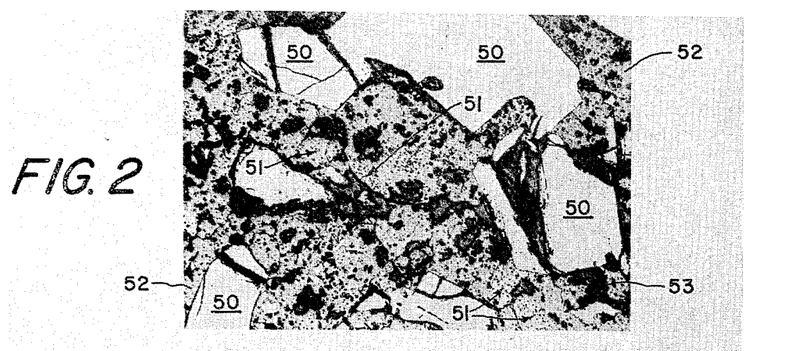
FIGS. 2, 3, 4, 5, 6, and 7 are microphotographs of various refractory compositions, according to this invention.
Figure 3:
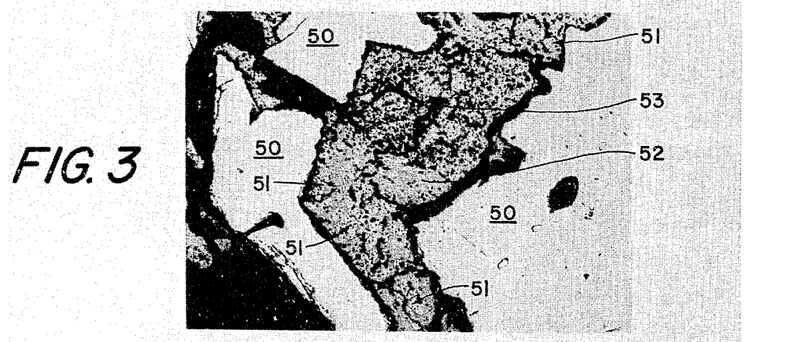
Figure 4:
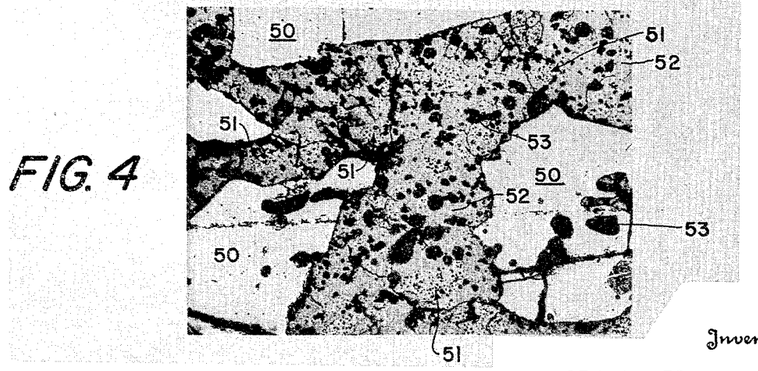
Figure 5:
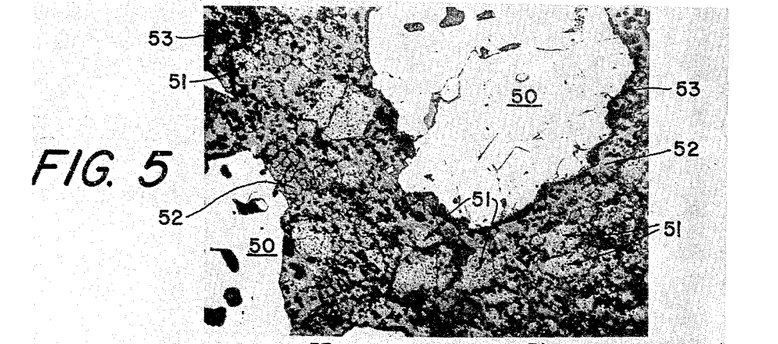
Figure 6:
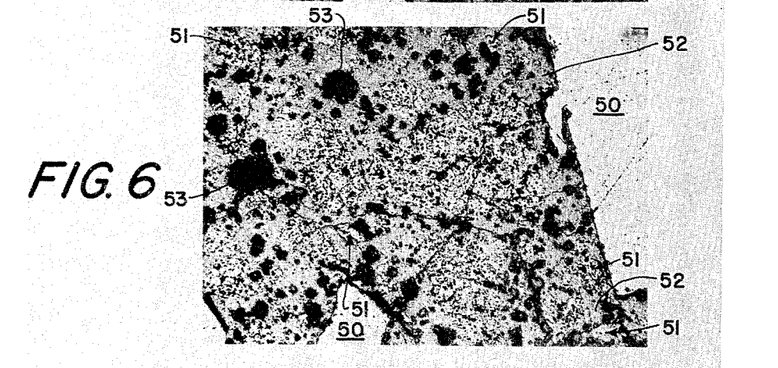
Figure 7:
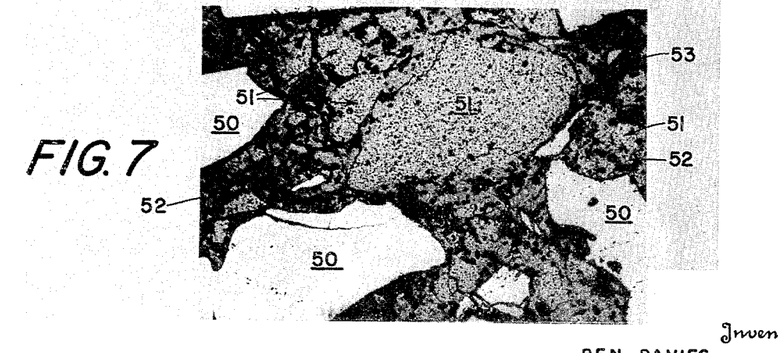

FIG. 2 is microphotograph at 60X magnification of Mix D, FIG. 3 of Mix J, FIG. 4 of Mix K, FIG. 5 of Mix L, FIG. 6 of Mix Q, and FIG. 7 of Mix P. All of the microphotographs were taken at the same magnification.

Throughout these figures, silicon carbide particles 50, alumina particles 51, groundmass 52, and void areas 53 bear the same number designation. The major single component of the mixes shown in FIGS. 2–7 is silicon carbide particles 50 which, microscopically examined, generally have massive angular forms which edges showing gradations from rounded to fairly straight. Open fissures sometimes occur adjacent the separate silicon carbide particles, which fissures sometimes extend around the particle periphery. Groundmass 52 is substantially entirely mullite formed in situ with widely dispersed, small inclusions of heat-altered silica, usually cristobalite and quartz; but, for convenience, here considered all to be the form of silica known as cristobalite (determined by X-ray, not visible at 60X magnification) and very fine particles of alumina 51. The alumina is characterized by peripherally corroded grains sometimes bonded to each other, and showing little evidence of peripheral voids, but having a number of small voids in the separate particles thereof.

By X-ray diffraction techniques, it was determined that the cristobalite content of the samples ranged between 1% (as the 90/10 line is approached) and 4% (as the 60/40 line is approached), by weight. The dispersion of cristobalite through the groundmass is considered advantageous, since it represents $SiO_2$ in an available form promoting continued reaction with the remaining available alumina in the groundmass for the contined formation of mullite in situ. While the distribution of voids 53 in FIGS. 2 through 7 appears to have a somewhat different appearance from mix to mix, they can be generally characterized as widely distributed and not generally connected. In FIGS. 2–7, the different color gradations of the groundmass is due, in a large degree, to different reflections in the polished sections from which the photomicrographs were made.

The tests reported above and plotted on the ternary diagram, FIG. 1, are illustrative of testing work to determine preferred compositions, according to this invention. In other tests, compositions were made along and to the right of the 90/100 $Al_2O_3/SiO_2$ line designated 12 in FIG. 1. For instance, a mix having the following composition was made.

TABLE V

*(All parts by weight)*

Silicon carbide (sizing, U.S. series): Percent
  8/16 mesh ______________________________ 20
  16/30 mesh _____________________________ 20

Alumina (sizing, Tyler series):
  10/65 mesh _____________________________ 20
  −65 mesh _______________________________ 19
  −325 mesh ______________________________ 15

Silica (sizing, Tyler series):
  −200 mesh ______________________________ 1
  −325 mesh ______________________________ 5

Total batch (sizing, Tyler series):
  −65 mesh or finer _______________________ 40

This mix (A–1 in FIG. 1) was manufactured into shapes, and subjected to tests similar to those reported in Table IV above. These shapes were found to have a density of 175 pounds per cubic foot, a modulus of rupture at room temperature of about 1480 p.s.i., and a modulus of rupture at 2500° F. of about 1340 p.s.i. Such a hot modulus of rupture is satisfactory for some service environments. This tended to be characteristic of the mixes having more than 25%, by weight of SiC and following generally along the 90/10 alumina/silica line but below the 50% SiC line, in that, with an increase in temperature, modulus of rupture decreased; whereas, the mixes within the preferred compositional range, with the exception of Mix N (which is also on the 90/10 line 12), tended to increase in strength under temperature. Good sag resistance was noted for Mix A–1, with little deflection in a sag test at 2730° F. By "generally along the 90/10 alumina/silica line" we mean the silica may vary from at least 5% to no more than about 15%, by weight.

Figure 8:
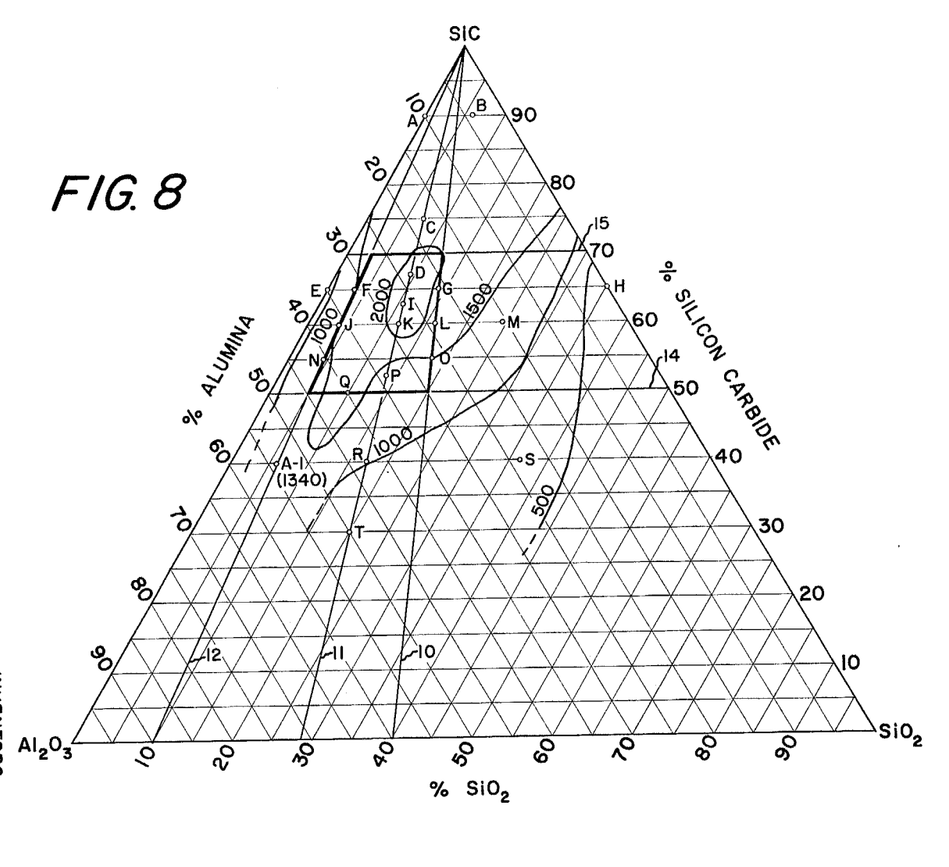
FIG. 8 is illustrative of hot strength isomods for compositions on the ternary diagram of FIG. 1.

FIG. 8, which shows a plot of the hot strengths of the various mixes of Table III and Table V, also serves to clearly indicate the uniqueness of our compositions. This chart was prepared by locating various mixes on the ternary diagram, noting beside them their hot modulus figures (at 2500° F.), and then drawing in the lines which might be called "isomods" at 500, 1000, 1500 and 2000 p.s.i. We use this term to refer to lines connecting all compositions having equivalent hot modulus of rupture. It will be noted that some of our preferred compositions (D, I, K) lie on a high plateau with regard to hot modulus, all having strength exceeding 2000 p.s.i. at 2500° F.

In general, it will be seen that the area of our invention centers around this plateau or ridge, and that it is generally characterized by high hot strength. The fact that the area of high strength is influenced by the $Al_2O_3/SiO_2$ ratio is borne out by these observations:

(1) The long axis of the +2000 p.s.i. plateau seems roughly to correspond to the mullite ratio line 11 ($Al_2O_3/SiO_2$ of 71.8/28.2).

(2) The high strength ridge of FIG. 8, and particularly the 1000 and 1500 p.s.i. isomods, indicate a tilting or canting toward the 90/10 $Al_2O_3/SiO_2$ ratio as the content of SiC in the mixes drops below 50%, as in A–1.

Thus, while the preferred compositions for refractories, according to this invention, fall within the area of the line intersections 20, 21, 22 and 23, it is also intended to include compositions generally along the 90/10 line 12, above 25%, by weight, silicon carbide, and in which the silicon carbide is characterized by a carefully controlled coarse particle configuration.

Somewhat greater hot strength and even greater oxidation resistance may be had, according to our invention, by adding zircon, largely as zircon in granular form (about −100+325 mesh, Tyler), for a portion of the silicon carbide of the compositions falling within the area of FIG. 1, banded by the lines intersecting at 20–21–22–23. The ratio of zircon to silicon carbide, however, should not exceed 2 parts zircon to 1 part silicon carbide. Satisfactory refractory is also manufactured by substituting granular zircon for silicon carbide in the mixes of this invention falling generally along the 90/10 line of the ternary diagram of FIG. 1, between 25 and 50% SiC. However, the same preferred ratio parameter should be observed.

In actual tests, brick were manufactured and subjected to tests similar to those discussed above, relative to Tables III and IV. The raw materials were the same, except for the zircon, discussed above, which was about 99+% pure.

Table VI below details exemplary mixes tested:

TABLE VI

|  | A–Z | B–Z | C–Z |
|---|---|---|---|
| Zircon (sizing, Tyler series): | Percent | Percent | Percent |
|   −100+325 mesh | 40 | 25 | 10 |
|   −400 mesh |  | 5 |  |
| Silicon carbide (sizing, U.S. series): |  |  |  |
|   8 on 16 mesh | 20 | 20 |  |
|   −16 on 30 mesh |  | 20 | 50 |
| Alumina (sizing, Tyler series): |  |  |  |
|   60 mesh | 15 | 7.5 | 15 |
|   −325 mesh |  |  |  |
| Silica (sizing, Tyler series): |  |  |  |
|   −200 mesh | 5 | 2.5 | 5 |
|   −325 mesh | 5 | 5 | 5 |

Table VII below details the results of testing:

TABLE VII

| | Weight, p.c.f. | Modulus of rupture, p.s.i. | Porosity | Modulus of rupture at 2,500° F. |
|---|---|---|---|---|
| A–Z | 194 | 2,810 | 14.8 | 2,050 |
| B–Z | 195 | 3,080 | 10.1 | 2,220 |
| C–Z | 179 | 2,860 | 10.8 | 3,080 |

With regard to the foregoing discussion of the grind of the silicon carbide, we find it essential that the major part be coarser than 30 mesh U.S. series screen (equivalent to about a 28 mesh Tyler screen), the top size being subjected to more elastic control—since the chief effect of variation in the top size will be to control the surface smoothness of the product. A small proportion of particles as coarse as 4 mesh U.S. series screen (about equivalent to a 4 mesh Tyler screen) would not vitiate the invention, but certainly a grind such as —6 mesh is to be preferred. Thus, we would hold that —6+30 mesh, U.S. series, or about —6+28 mesh Tyler series, is, in essence, the optimum sizing for the silicon carbide. Regarding its variation toward the fine side, we know that the substitution of a 35 mesh U.S. series screen or even a 48 mesh screen for our 30 mesh U.S. series screen would yield a departure only in degree from our preferred teachings, but in no case would we want to use any appreciable percentage of silicon carbide finer than 70 mesh U.S. series screen unless the product is to be used in less demanding service environment such as for example in temperature environments of less than 2500° F.

As to the size grading or grind for the silica and alumina (all sizing discussed is Tyler series), it is essential that at least a portion of the silica be —325 mesh and, of course, all of the silica could be —325 mesh. The alumina will be size graded as required to make a workable refractory batch. In this regard, the sizing of the alumina is more or less variable, in that the sizing of the silicon carbide and silica must be maintained within certain critically controlled ranges. The manner in which the sizing of the alumina is varied is well understood by those skilled in the art.

The original concept of our invention depended on a large degree of suppression of the fine silicon carbide to improve such properties as oxidation resistance. We find that there is a considerable usage for product according to the invention where oxidation resistance is greatly suppressed though not to the degree obtained by substantial elimination of fine SiC. While the best refractory according to the invention has little or no silicon carbide fines, we now find that so long as the mix proportions, previously dealt with, are adhered to, the sizing of the silicon carbide becomes somewhat less critical for some uses. We find that it needs to be of essentially the same maximum particle size, that is about —6 mesh, U.S. series, but there now appears to be little reason for removing its finest particles, which are a natural result of the grinding process. Thus, in crushing and grinding silicon carbide so that it passes a 6 mesh U.S. screen there will be a resulting gradation of particles including all sizes. The percentage passing 70 mesh U.S. series screen or 65 mesh Tyler screen, for example, may constitute an appreciable portion of the resultant grind. As much as 10 to 20% of the entire silicon carbide charge may be of this fineness. It is true that there is a somewhat greater tendency to oxidation and to eventual growth, but generally this will be of minor importance so long as the teachings of our invention are adhered to, particularly the requirements regarding the groundmass of alumina and silica, which encapsulate the silicon carbide grains, and the ultrafine silica, which is an essential component.

The following examples are indicative of other mixes which we suggest for fabrication of satisfactory refractories according to this invention.

EXAMPLE A–F

A batch is prepared consisting of about 60% silicon carbide, about 13.5% of —65 mesh tabular alumina, about 15% of —325 mesh calcined alumina, about 6.5% of —200 mesh potters flint, and about 5% of volatilized silica. The silicon carbide is so size graded as to have the following grind: —6+14 mesh—about 25%, —14+28 mesh—about 40%, —100 mesh—about 10%.

EXAMPLE B–F

A mixture is prepared having the overall size grading substantially as follows: on 10 mesh—about 5%, —10+28 mesh—about 35%, —28+65 mesh—about 25%, —65 mesh—about 35%. About 75% of that passing the 65 mesh screen also passes a 325 mesh screen. The batch components are silicon carbide, tabular alumina, —325 mesh calcined alumina, —200 mesh potters flint, and —325 mesh volatilized silica. The weight proportions are substantially as set forth under Example A–F, except the silicon carbide amounts of 70% by weight, of the total batch. The amount of tabular alumina is reduced proportionately from the Example A–F composition, so it amounts to only about 5% of this batch.

EXAMPLE C–F

Example C–F has substantially the same sizing and batch components as given under Example A–F, above, except the silicon carbide only amounts to about 50%, by weight, of the total batch; the tabular alumina is commensurately increased to provide the overall size grading substantially the same as given under Example A–F.

EXAMPLE D–F

As a practical matter, for service environments of less than 2500° F., substantially any of the mixes falling within the area defined by the lines intersecting at the points 20, 21, 22 and 23 on the triaxial diagram of FIG. 1 are acceptable, with the silicon carbide component size graded, preferably, as discussed under Example A–F, above.

EXAMPLE E–F

Other satisfactory batches can be similar to the batches of Table VI, in which the silicon carbide is size graded as set forth under Example A–F, above.

As a rule, the satisfactory compositions according to this invention, as discussed under Examples A–F through E–F, will have physical properties similar to comparable batch compositions discussed in Table III. However, these compositions would not usually be used above service temperatures of about 2500° F., since above that temperature some surface blemishes may develop. Further, in the steam oxidation tests, the linear expansion may run as high as 3%, as compared to the less than 1% expansion of the preferred mixes of Table III. Of course, even 3% expansion is good, as compared to the over 10% linear expansion normally associated with such as all silicon carbide kiln furniture. A modulus of rupture at 2500° F., for shapes made for the batches of Examples A–F through E–F, consistently falls above 1000 p.s.i., and, as a rule, is above 1900 p.s.i. In general, their modulus of rupture at 2500° F. will be about the same as a comparable batch, as will overall chemical content, chosen from Table III. Also, microscopically, the final product of Examples A–F through E–F is substantially the same as set forth above with respect to FIGS. 2–7, the only difference being some fine —70 mesh (U.S. series) SiC is apparent in the groundmass.

In the foregoing discussion, all parts and percentages are by weight, all analyses are on the basis of an oxide analysis, unless otherwise stated, and all mesh size designations are Tyler series and U.S. series as indicated. We have in many instances made reference to two different screen sizing series, instead of uniformly converting all sizing to one screen series, because the art usually sizes silicon carbide by the U.S. series and will more readily understand our invention in the first instance by U.S. screen series designations therefor.

This invention also relates to refractories of high alumina content by which is meant, for the purposes of this invention, refractories containing at least about 50 percent of $Al_2O_3$ by analysis. This part of the invention is directed, in part, to material disclosed but not claimed in copending application Serial Number 847,865 for "Alumina Refractories" now U.S. Patent No. 3,067,050.

High alumina refractories are generally classified by their $Al_2O_3$ content in groups having, approximately, 50, 60, 70, 80, 90, or 99 percent $Al_2O_3$ by analysis. Those containing 50 to 90 percent of $Al_2O_3$ are made by blending various high alumina refractory materials, while those of 99 percent content are made from high purity alumina. The common high alumina refractory materials and their typical $Al_2O_3$ contents are calcined alumina, 99 percent; calcined South America bauxite, 88 percent; calcined Alabama bauxite, 74 percent; calcined diaspore, 76 percent; burley diaspore, 48 and 58 percent; and kyanite, 56 percent. All of these materials are chemically compatible and accordingly they can be blended to provide almost any desired resultant alumina content. Further adjustment is sometimes accomplished by including minor amounts of clay or silica.

Refractory brick of such compositions are usually made by the power press, impact, or extrusion processes. In the power press process the raw materials are ground, screened to the desired sizes, blended and thoroughly mixed with a small but controlled amount of water. The moistened batch is then fed to a press in which the brick are formed under high pressure following which they are dried and then fired to develop the desired properties.

Impact pressing involves the use of a vibration press or ram with similar batches.

In the extrusion process the batch tempered with water is extruded through a die in the form of a dense column which is cut by wires into brick that are re-pressed to give them sharp corners and edges and smooth surfaces.

Batches of this type are also shaped by ramming or gunning them under pressure at the place where they are to serve and where they are fired in place.

It is among the objects of this part of the invention to provide high alumina refractories which, as compared with those previously available, are of increased strength, increased abrasion resistance, higher density, lower porosity, lower permeability, and higher refractoriness, and which may be produced from the customary high alumina materials by practices standard in the refractory trade.

Another object is to provide batches for making refractories in accordance with the foregoing object.

Still another object is to provide a method of making refractories in accordance with the first-named object that is simple and readily practiced with standard apparatus used in the manufacture of refractories.

The invention is in part predicated upon discovery that high alumina refractories of character superior to those presently available are produced by the addition of, by weight, at least 1 percent to not over 10 percent by weight of finely divided amorphous silica to a batch of the desired alumina content.

One form of amorphous silica that gives excellent results in the practice of the invention is volatilized silica, i.e., silica which has been deposited from a vapor phase. A typical silica of this type results from the reduction of silica to form silicon alloys, such as ferrosilicon. A similar silica fume can also be produced by reducing quartz with carbon or other suitable reducing agent, treating the vaporous products of the reduction with an oxygen-yielding gas, and condensing the silica in finely divided form. The amorphous silicas used in the practice of this invention are substantially all finer than 50 microns, and more than half is finer than 10 microns. Such a silica analyzes at least 90 percent $SiO_2$ and normally runs about 95 percent, with between 2 and 3 percent of total FeO, MgO and $Al_2O_3$, and about 2 percent ignition loss.

In the practice of the invention batches are prepared in the general manner alluded to above. That is, the high alumina materials are ground, screened and blended to give the desired alumina content with the remainder consisting essentially of the other natural constituents of the ores used. The exact screen sizing to be used is dependent upon such factors as the raw materials used and the purpose to which the refractory is to be put but this is a matter well within the knowledge and skill of those familiar with the refractory field. There is blended into the batch amorphous silica in an amount from at least about 1 percent up to not over 10 percent by weight of the batch. There is further included 5 to less than about 25% of silicon carbide. There may be added to the batch a temporary binder, of which a wide variety are known and used in the manufacture of refractory bricks, and the batch is tempered with water and then pressed following which the shapes are dried and then fired.

In the following examples, the standard power press method of making high alumina brick was employed. The components were crushed and thoroughly blended together to give a typical brickmaking grind, such as is noted below:

| | Percent |
|---|---|
| −3+10 mesh | 18 |
| −10+28 mesh | 30 |
| −28+65 mesh | 12 |
| 065 mesh | 40 |

About 4 to 6 percent by weight of water was added as was about 2 percent of waste sulfite liquor as a temporary binder. The 2 percent sulfite waste liquor used in the examples represents a common industry practice of adding a small amount of one of a variety of cold bonding agents so that the brick can more readily be handled with minimum breakage during manufacture. The mix was then pressed into brick, 9 x 4½ x 2½ inches, at about 4000 p.s.i. The shapes were removed from the press and oven-dried at about 230° F. overnight. The brick were then fired for 10 hours at about 2730° F.

As compared to the compositions of the previously copending application Serial No. 847,865, which is now United States Patent No. 3,067,050, the addition of the 5 to less than about 25% of silicon carbide or zircon, or small amounts of each, show striking benefits as far as increasing thermal shock resistance when used in compositions of the type typically shown in said application, now Patent No. 3,067,050. For example, a substitution of from 5 to 25% −8+30 mesh Tyler silicon carbide or 5–10% of granular, i.e. −100 mesh Tyler, zircon, for a similar amount in grain sizing of tabular alumina in the brick mixes of said patent, provides a body possessing improved resistance to thermal shock when used in compositions and typical brickmaking grinds as outlined below (all parts by weight):

| | I | II |
|---|---|---|
| | Percent | Percent |
| Silicon carbide −8+30 mesh | 5–25 | |
| Zircon −100 mesh | | 5–10 |
| Tabular alumina | 85–65 | 85–80 |
| Potter's flint | 9–0 | 9–0 |
| Volatilized silica (preferred range 3–7%) | 1–10 | 1–10 |

The disclosure of said application No. 847,865, now United States Patent No. 3,067,050, is here incorporated by reference as for the chemical analyses of high alumina materials, methods of manufacture, and the critical ingredients parameters for the high alumina systems to which the 5 to less than 25% of silicon carbide on 5–10% of granular or −100 mesh zircon are added.

Having thus described the invention in detail and with sufficient particularity as to enable those skilled in the art to practice it, what is desired to have protected by Letters Patent is set forth in the following claims.

We claim:

1. A fired refractory body formed from a batch consisting essentially of alumina, silica, a portion of the silica being uncombined silica in the form of volatilized silica, and silicon carbide in subtsantially the proportions defined by (1) the area within the lines intersection at the points 20–21–22–23, and (2) along the 90/10 alumina/silica line between 25% to about 50%, by weight, silicon carbide and between 5 and 15% silica, on the ternary diagram of FIG. 1, the major part of the silicon carbide being about —4+48 U.S. standard mesh, with no more than about 20% of the silicon carbide passing a 70 mesh U.S. standard screen, said fired body microscopically characterized by from 25 to 70%, by weight, of silicon carbide, the particles of which are relatively coarse, irregular, angular forms with the separate particles thereof showing gradations from generally straight to rounded configuration, the groundmass of the fired body being characterized by a complex association of mullite formed in situ with minor amounts of heat-altered silica and alumina distributed therethrough, the heat-altered silica ranging between about 1 and 4%, by weight, the alumina in the groundmass being characterized as rough, peripherally corroded grains.

2. The fired body of claim 1 in which the silica in the batch from which it is formed is substantially entirely volatilized silica.

3. In the fired body of claim 1 in which the remainder of the silica in the batch from which it is formed is crystalline silica.

4. The fired body of claim 1 in which at least a portion of the alumina and silica content of the batch from which the body is formed is in the form of calcined flint clay.

5. The fired refractory body of claim 1 in which the silicon carbide constitutes about 60 parts, by weight, of the batch from which the body is made, the alumina about 30%, by weight, of the batch from which the body is made, and the silica about 10%, by weight, of the batch from which the body is made.

6. The fired refractory body of claim 1 in which the alumina content of the batch from which the body is formed is substantially entirely high purity synthetic alumina.

7. The fired refractory body of claim 3 in which the constituents of the batch from which the body is formed are in substantially the proportions defined by the area of the lines intersecting at the points 20–21–22–23 of the ternary diagram of FIG. 1.

8. A fired refractory body made from a batch consisting essentially of silicon carbide, alumina, and silica, a portion of the silica being uncombined silica in the form of volatilized silica, the silicon carbide, alumina, and silica being in substantially the proportions, by weight, defined by the area within the 2000 p.s.i. isomod of FIG. 8, the major portion of the silicon carbide being —4+48 U.S. standard mesh, with no more than 20% of the silicon carbide passing a 70 U.S. standard mesh, said fired body characterized by a major single component of silicon carbide, the particles of which are relatively coarse, irregular, angular forms with the edges of the separate particles thereof showing gradations from generally straight to rounded configuration, the groundmass of the fired shape being characterized by a complex association of mullite formed in situ, with minor amounts of heat-altered silica and alumina distributed therethrough, the alumina being characterized as rough, peripherally corroded grains, said heat altered silica constituting about 1 to 4%, by weight, of the fired body.

9. That method of making a fired refractory body comprising the steps of, forming a batch consisting essentially of alumina, silica, and a portion of the silica being uncombined silica in the form of volatilized silica, and silicon carbide in substantially the proportions defined by (1) the area of the lines intersecting at the points 20–21–22–23, and (2) along the 90/10 alumina/silica line between 25 and about 50%, by weight, silicon carbide and within the range 5 to 15% silica, of the ternary diagram of FIG. 1, the major part of the silicon carbide being about —4+48 U.S. standard mesh with no more than about 20% of the silicon carbide passing a 70 U.S. standard mesh screen, tempering the batch, forming the tempered batch into shapes, firing said formed shapes to obtain a fired body microscopically characterized by from 25 to 70%, by weight, of silicon carbide, the particles of which are relatively coarse, irregular, angular forms with the separate particles thereof showing gradations from generally straight to rounded configuration, the matrix of the fired body being characterized by a complex association of mullite formed in situ with minor amounts of heat-altered silica and alumina distributed therethrough, the alumina being characterized by rough, peripherally corroded grains, the heat altered silica constituting between about 1 and 4%, by weight, of the fired body, and recovering a fired refractory shape.

10. A fired refractory body made from a batch consisting essentially of silicon carbide, $Al_2O_3$, and $SiO_2$, a portion of the $SiO_2$ being uncombined silica in the form of volatilized silica, said silicon carbide constituting from about 50 to 70%, by weight, of the batch and the resulting fired body, the remainder of the batch being substantially all the $Al_2O_3$ and $SiO_2$, said $Al_2O_3$ and $SiO_2$ being present in a weight ratio between about 90 $Al_2O_3$/10 $SiO_2$ and 60 $Al_2O_3$/40 $SiO_2$, the major part of the silicon carbide being —4+40 U.S. standard mesh with no more than about 20% thereof passing a 70 U.S. standard mesh screen.

11. A fired refractory body made from a batch consisting essentially of alumina, finely divided silica, a portion of the silica being uncombined silica in the form of volatilized silica, and mixture of silicon carbide and zircon in a weight ratio not exceeding two parts zircon to one part silicon carbide, the mixtures of silicon carbide and zircon constituting from about 50 to 70%, by weight, of the refractory, the remainder of the batch from which the fired refractory body is made being alumina and silica in a weight ratio ranging from about 90 alumina/10 silica to 60 alumina/40 silica, the major part of the silicon carbide being about —4+48 U.S. standard mesh with no more than about 20% of the silicon carbide passing a 70 U.S. standard mesh screen, the zircon being substantially all finer than about 100 mesh.

12. A fired refractory body made from a batch consisting essentially of alumina, finely divided silica, a portion of said finely divided silica being uncombined silica in the form of volatilized silica, and mixtures of silicon carbide and zirconia in a weight ratio not exceeding about two parts zircon to one part silicon carbide, the mixtures of silicon carbide and zircon comprising from 25% to no more than about 50%, by weight, of the refractory, and the remainder being the alumina and silica in a weight ratio of about 90/10, but in which the silica content is variable between at least about 5 and no more than about 15%, by weight, of the batch, the major portion of the silicon carbide being finer than about 4 and coarser than about 48 U.S. standard mesh, the zircon being substantially all finer than about 100 mesh.

13. A batch consisting essentially of alumina, finely divided silica, a portion of said finely divided silica being uncombined silica in the form of volatilized silica, and a mixture of silicon carbide and zircon in a weight ratio not exceeding two parts zircon to one part silicon carbide, the mixtures of silicon carbide and zircon constituting from about 50 to 70%, by weight, of the refractory the remainder of the batch from which the fired refractory is made being alumina and silica in a weight ratio ranging from about 90 alumina/10 silica to 60 alumina/40 silica, the major part of the silicon carbide being about −4+48 U.S. standard mesh with no more than about 20% of the silicon carbide passing a 70 U.S. standard mesh screen, the zircon being substantially all finer than about 100 mesh.

14. A batch consisting essentially of alumina, finely divided silica, a portion of the silica being uncombined silica in the form of volatilized silica, and mixtures of silicon carbide and zirconia in a weight ratio not exceeding about two parts zircon to one part silicon carbide, the mixtures of silicon carbide and zircon comprising from 25% to no more than about 50%, by weight, of the refractory, and the remainder being the alumina and silica in a weight ratio of about 90/10, but in which the silica content is variable between at least about 5 and no more than about 15%, by weight, of the batch, the major portion of the silicon carbide being finer than about 4 and coarser than about 48 U.S. standard mesh, the zircon being substantially all finer than about 100 mesh.

15. The fired refractory body of claim 11 in which all of the silica in the batch from which it is made is volatilized silica.

16. The fired refractory body of claim 11 in which the remainder of the silica in the batch from which the body is made is crystalline silica.

17. The fired refractory body of claim 12 in which all of the silica in the batch from which it is made is volatilized silica.

18. The fired refractory body of claim 12 in which the remainder of the silica in the batch from which the body is made is crystalline silica.

19. In a batch for making high alumina refractory consisting essentially of, by weight, from at least 1 percent to not over 10 percent of substantially pure volatilized silica, and the remainder being alumina refractory material subdivided to range in graded particle sizes from about −3 to +10 to −65 mesh, having less than about 1.3 percent, by weight, of iron oxide, and selected from the group consisting of alumina and aluminum ores containing at least about 50 percent of $Al_2O_3$, by analysis, whereby the batch contains at least about 50 percent of $Al_2O_3$, by analysis supplied by said refractory material, said batch capable of being formed under pressure to a self-sustaining body and upon firing to exhibit a very fine micron size crystalline mullite binding between the particles having very small and highly dispersed voids whereby a coarse textured yet dense and highly impermeable body is obtained, the improvement which comprises from about 5 to less than 25% by weight of about −8+30 mesh Tyler silicon carbide in the batch to thereby improve the resistance to thermal shock in bodies made from the batch.

20. In a fired high alumina refractory body prepared from a mix consisting essentially of, by weight, from at least 1 percent to not over 10 percent of substantially pure volatilized silica, the remainder being a coarse ground alumina refractory material, having less than about 1.3 percent, by weight, of iron oxide, and selected from the group consisting of alumina, aluminum ores and mixtures thereof containing at least about 50 percent of $Al_2O_3$, by analaysis, and sufficient crystalline silica to maintain the $Al_2O_3$ analysis of the total mix between about 50 percent and about 90 percent of $Al_2O_3$, by analysis, supplied by said refractory material, said volatilized silica, upon firing being substantially all in the form of a fine crystalline mullite binding between the particles of refractory material and in which said mullite appears in the form of a mass of submicron size crystals having very small and high dispersed voids whereby a coarse textured yet dense and highly impermeable body is obtained, the improvement which comprises from about 5 to less than 25% by weight of about −8+30 mesh Tyler silicon carbide in the batch to thereby improve the resistance to thermal shock in the body made from the batch.

21. In methods of making high alumina refractory bodies from mixes consisting essentially of 90 to 99 parts by weight of a coarse ground alumina refractory material and from at least one to not over 10 parts by weight of substantially pure volatilized silica, the improvement which comprises adding from 5 to less than 25 parts by weight of −8+30 mesh silicon carbide to the mixes to thereby obtain improved resistance to thermal shock.

22. A batch for making high alumina refractory consisting essentially of, by weight, from at least 1 part by weight to not over 10 parts by weight of substantially pure volatilized silica, and the remainder being alumina refractory material subdivided to range in graded particle sizes from about −3 to +10 to −65 mesh, having less than about 1.3 parts by weight of iron oxide, and selected from the group consisting of alumina and aluminum ores containing at least about 50 percent of $Al_2O_3$, by analysis, whereby the batch contains at least about 50 parts by weight of $Al_2O_3$, by oxide analysis supplied by said refractory material, said batch capable of being formed under pressure to a self-sustaining body and upon firing to exhibit a very fine micron size crystalline mullite binding between particles having very small and highly dispersed voids whereby a coarse textured yet dense and highly impermeable body is obtained, the improvement which comprises from about 5 to 10 parts by weight of −100 mesh Tyler zircon in the batch to thereby improve the resistance to thermal shock in bodies made from the batch.

23. In a fired high alumina refractory body prepared from a mix consisting essentially of, by weight, from at least 1 part by weight to not over 10 parts by weight of substantially pure volatilized silica, the remainder being a coarse ground alumina refractory material, having less than about 1.3 parts by weight of iron oxide, and selected from the group consisting of alumina, aluminum ores and mixtures thereof containing at least about 50 percent of $Al_2O_3$, by analysis, and sufficient crystalline silica to maintain the $Al_2O_3$ analysis of the total mix between about 50 parts and about 90 parts by weight of $Al_2O_3$, by oxide analysis, supplied by said refractory material, said volatilized silica, upon firing being substantially all in the form of a fine crystalline mullite binding between the particles of refractory material and in which said mullite appears in the form of a mass of sub-micron size crystals having very small and high dispersed voids whereby a coarse textured yet dense and highly impermeable body is obtained, the improvement which comprises from 5 to 10 parts by weight of −100 mesh Tyler zircon in the batch to thereby improve the resistance to thermal shock in the body made from the batch.

24. In high alumina refractory bodies prepared from mixes consisting essentially of 90 to 99 parts by weight of a coarse ground alumina refractory material and from at least one to not over 10 parts by weight substantially pure volatilized silica, the improvement which comprises from 5 to 10 parts by weight of −100 mesh Tyler zircon in the bodies and mixes from which they are made to thereby obtain improved resistance to thermal shock.

25. A batch for making high alumina refractory bodies consisting essentially of high alumina refractory material subdivided to range in graded particle sizes from about −3 to +10 to −65 mesh, having less than about 1.3 percent, by weight, of iron oxide, substantially pure volatilized silica, crystalline silica, and silicon carbide, said alumina refractory material selected from the group consisting essentially of, alumina, aluminum ores, and mixtures thereof containing at least about 50 percent of $Al_2O_3$, by analysis, said batch consisting essentially of from 5 to less than 25 percent of −8+30 mesh Tyler silicon carbide, 85 to 65 percent of the selected alumina refractory material, from 9 to 0 percent of crystalline silica, and from 1 to 10 percent of volatilized silica, said batch capable of being formed under pressure to a self-sustaining body and upon firing to exhibit a very fine micron size crystalline mullite binding between particles having very small and highly dispersed voids whereby a coarse textured yet dense and highly impermeable body is obtained.

26. In a batch for making high alumina refractories and consisting essentially of, by weight, from at least 1% to not over 10% of substantially pure volatilized silica, and the remainder being alumina refractory material and subdivided to range in graded particle sizes from about −3 to +10 to −65 mesh, having less than about 1.3% by weight, of iron oxide, and selected from the group consisting of alumina and aluminum ores containing at least about 50% of $Al_2O_3$, by analysis, whereby the batch contains at least about 50% of $Al_2O_3$, by analysis, supplied by said refractory material, said batch capable of being formed under pressure to a self-sustaining body and, upon firing, to exhibit a very fine micron size crystalline mullite binding between the particles having very small and highly dispersed voids, whereby a coarse textured, yet dense and highly impermeable body is obtained, the improvement which comprises material from the group consisting of about −8+30 mesh Tyler silicon carbide, and about −100 mesh Tyler zircon constituting from 5 to less than about 25%, by weight of the batch to thereby improve the resistance of thermal shock in bodies made from the batch.

27. In a fired high alumina refractory body prepared from a mix consisting essentially of, by weight, from at least 1 to not over 10 parts by weight of substantially pure volatilized silica, the remainder being a coarse ground, alumina refractory material, having less than about 1.3 parts by weight of iron oxide, and selected from the group consisting of alumina, aluminum ores and mixtures thereof, containing at least about 50% of $Al_2O_3$, by analysis, and sufficient crystalline silica to maintain the $Al_2O_3$ analysis of the total mix between about 50% and about 90% of $Al_2O_3$, by analysis, supplied by said refractory material, said volatilized silica, upon firing, being substantially all in the form of a fine crystalline mullite binding between the particles of refractory material, and in which said mullite appears in the form of a mass af submicron size crystals, having very small and highly dispersed voids, whereby a coarse textured, yet dense and highly impermeable body is obtained, the improvement which comprises material from the group consisting of about −8+30 mesh Tyler silicon carbide, and about −100 mesh Tyler zircon, constituting from 5 to less than about 25 parts by weight of the batch to thereby improve the resistance to thermal shock in the body.

References Cited by the Examiner
UNITED STATES PATENTS

| | | | |
|---|---|---|---|
| 2,314,758 | 3/1943 | Berns | 106—44 |
| 2,428,178 | 9/1947 | Reik et al. | 106—69 |
| 2,768,087 | 10/1956 | Bird | 106—44 |

TOBIAS E. LEVOW, *Primary Examiner.*

J. POER, *Assistant Examiner.*